United States Patent
Rajbharti (10) Patent No.: US 7,721,018 B2
(45) Date of Patent: May 18, 2010

(54) DIRECT MEMORY ACCESS CONTROLLER WITH FLOW CONTROL

(75) Inventor: Nilesh Rajbharti, Glendale, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 314 days.

(21) Appl. No.: 11/466,915

(22) Filed: Aug. 24, 2006

(65) Prior Publication Data

US 2008/0126662 A1    May 29, 2008

(51) Int. Cl.
*G06F 13/28* (2006.01)
*G06F 3/00* (2006.01)

(52) U.S. Cl. .............. 710/22; 710/23; 710/26; 710/28; 710/36

(58) Field of Classification Search .......... 710/22–28
See application file for complete search history.

(56) References Cited

U.S. PATENT DOCUMENTS

| | | | | |
|---|---|---|---|---|
| 4,161,719 A | * | 7/1979 | Parikh et al. | 375/365 |
| 4,989,135 A | * | 1/1991 | Miki | 710/22 |
| 5,175,818 A | * | 12/1992 | Kunimoto et al. | 709/250 |
| 5,463,762 A | * | 10/1995 | Morrissey et al. | 714/49 |
| 5,974,480 A | * | 10/1999 | Qureshi et al. | 710/27 |
| 5,983,289 A | | 11/1999 | Ishikawa et al. | |
| 6,018,777 A | * | 1/2000 | Shrock et al. | 710/24 |
| 6,038,607 A | * | 3/2000 | Hamilton et al. | 709/236 |
| 6,081,852 A | * | 6/2000 | Baker | 710/24 |
| 6,092,116 A | * | 7/2000 | Earnest et al. | 709/236 |
| 6,185,620 B1 | * | 2/2001 | Weber et al. | 709/230 |
| 6,775,693 B1 | * | 8/2004 | Adams | 709/213 |
| 6,826,354 B2 | * | 11/2004 | Tezuka | 382/218 |
| 2002/0027985 A1 | * | 3/2002 | Rashid-Farrokhi | 379/417 |
| 2002/0169900 A1 | * | 11/2002 | Hiji | 710/22 |
| 2003/0079118 A1 | * | 4/2003 | Chow | 712/300 |
| 2004/0015617 A1 | * | 1/2004 | Sangha et al. | 710/10 |
| 2005/0154801 A1 | * | 7/2005 | Neuman et al. | 710/22 |
| 2006/0206634 A1 | * | 9/2006 | Torisaki et al. | 710/22 |

FOREIGN PATENT DOCUMENTS

| | | | |
|---|---|---|---|
| EP | 0422776 A2 | * | 4/1991 |
| EP | 470 030 A2 | | 6/1991 |
| EP | 0 470 624 A3 | | 8/1991 |
| EP | 1 271 330 A2 | | 1/2003 |
| JP | 59099525 | * | 6/1984 |

OTHER PUBLICATIONS

TriMedia Product Group, "TriMedia TM1000 Preliminary Data Book", Philips Electronics North America Corporation, 1997, p. A-161.*
International Search Report and Written Opinion for PCT/US2007/076103 mailed Apr. 4, 2008.

* cited by examiner

*Primary Examiner*—Alan Chen
(74) *Attorney, Agent, or Firm*—King & Spalding L.L.P.

(57) ABSTRACT

A direct memory access controller has a data register for transferring data from a source to a destination address. A pattern register is provided and a data comparator is coupled with the data register and the pattern register for comparing the content of the data register with the content of the pattern register. A control unit coupled with the comparator controls the data flow and stops a data transfer if the comparator detects a match of the data register and the pattern register.

25 Claims, 6 Drawing Sheets

DIRECT MEMORY ACCESS CONTROLLER WITH FLOW CONTROL

TECHNICAL FIELD

The technical field of the present application relates to a direct memory access controller.

BACKGROUND

Direct memory access controller (DMA) are typically used in microprocessor systems, integrated microcontrollers, etc. DMA controllers are used to perform a data transfer from and to memory to and from a peripheral independently from the central processing unit of the computer system. To this end, a DMA controller can be seen as a second programmable processing unit with limited capabilities. Generally, a DMA controller is instructed to transfer a specific amount of data from a source location to a destination location. The source can be within a memory, for example, a data memory of a microcontroller, memory of a peripheral, or data generated by or accessible within a peripheral, such as an analog to digital converter, a port, a capture compare unit, etc. The destination can also be within a memory, thus, allowing high speed transfers within a memory device of a computer system or microcontroller. However, the destination can also be a peripheral, such as a digital to analog converter, a port, etc. To transfer data from a source to a destination the DMA controller must receive the respective source and destination addresses. In addition, each transfer length needs to be specified. To this end, the DMA controller needs to receive either the length of the data transfer or the start and end address of the data to be transferred. There, thus, exists a need for a more flexible DMA controller.

SUMMARY

In one embodiment, a direct memory access controller may comprise a data register for transferring data from a source to a destination address, a pattern register, a data comparator coupled with the data register and the pattern register, and a control unit coupled with the comparator operable to stop a data transfer if the comparator detects a match of the data register and the pattern register.

In another embodiment, a microcontroller may comprise a central processing unit, a bus coupled with the central processing unit, a memory coupled with the bus, a peripheral unit coupled with the bus, and a direct memory access controller coupled with the bus comprising a data register for transferring data from a source to a destination address, a pattern register, a data comparator coupled with the data register and the pattern register, and a control unit coupled with the comparator operable to stop a data transfer if the comparator detects a match of the data register and the pattern register.

In yet another embodiment, a microcontroller may comprise a central processing unit, a first bus coupled with the central processing unit, a peripheral unit coupled with the first bus, a second bus coupled with the central processing unit, a memory coupled with the second bus, a direct memory access controller coupled with the first and second bus comprising a data register for transferring data from a source to a destination address, a pattern register, a data comparator coupled with the data register and the pattern register, and a control unit coupled with the comparator operable to stop a data transfer if the comparator detects a match of the data register and the pattern register.

In a further embodiment, a method of performing a transmission of a plurality of data from a source to a destination by a direct memory access controller may comprise the steps of a) determining whether a pattern detection is used; b) storing start addresses for a source address and a destination address; c) if a pattern detection is used storing a pattern; otherwise storing a transmission length; d) reading data from the source address; e) storing data in the destination address; f) if a pattern detection is used, comparing the data with the pattern and terminating the transmission upon a match; g) incrementing the source and destination addresses; h) if no pattern detection is used, terminating the transmission if the transmission length has been reached; and i) repeating steps d)-h).

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

As stated above, in one embodiment, a direct memory access controller may comprise a data register for transferring data from a source to a destination address, a pattern register, a data comparator coupled with the data register and the pattern register, and a control unit coupled with the comparator operable to stop a data transfer if the comparator detects a match of the data register and the pattern register.

A direct memory access controller may further comprise an address comparator for comparing a source or destination address with a predefined end address. A direct memory access controller may further comprise logic means for generating an end of transmission signal from output signals of the data and address comparators. The pattern register may comprise a plurality of data segments and the data comparator can be controlled to compare a selected segment with the data register. A direct memory access controller may further comprise a plurality of comparators coupled with the data registers. A direct memory access controller may further comprise a multiplexer coupled with the pattern register and the data register. A direct memory access controller may further comprise a control unit for controlling the multiplexer.

As stated above, in another embodiment, a microcontroller may comprise a central processing unit, a bus coupled with the central processing unit, a memory coupled with the bus, a peripheral unit coupled with the bus, and a direct memory access controller coupled with the bus comprising a data register for transferring data from a source to a destination address, a pattern register, a data comparator coupled with the data register and the pattern register, and a control unit coupled with the comparator operable to stop a data transfer if the comparator detects a match of the data register and the pattern register.

The above mentioned direct memory access controller may further comprise an address comparator for comparing a source or destination address with a predefined end address. The direct memory access controller may further comprise logic means for generating an end of transmission signal from output signals of the data and address comparators. The pattern register may comprise a plurality of data segments and the data comparator can be controlled to compare a selected segment with the data register. The direct memory access controller may further comprise a plurality of comparators coupled with the data registers. The direct memory access controller may further comprise a multiplexer coupled with the pattern register and the data register. The direct memory access controller may further comprise a control unit for controlling the multiplexer.

As stated above, in a further embodiment, a method of performing a transmission of a plurality of data from a source to a destination by a direct memory access controller may comprise the steps of a) determining whether a pattern detection is used; b) storing start addresses for a source address and a destination address; c) if a pattern detection is used storing a pattern; otherwise storing a transmission length; d) reading data from the source address; e) storing data in the destination address; f) if a pattern detection is used, comparing the data with the pattern and terminating the transmission upon a match; g) incrementing the source and destination addresses; h) if no pattern detection is used, terminating the transmission if the transmission length has been reached; and i) repeating steps d)-h).

Such a method may further comprise using step h) even if a pattern detection is used. A plurality of data can be compared with a plurality of data pattern and only if the plurality of data matches the plurality of data pattern the transmission is terminated. The plurality of data pattern can be a sequential data pattern. The sequential data pattern may comprise a sequence of continuous data.

Figure 1:
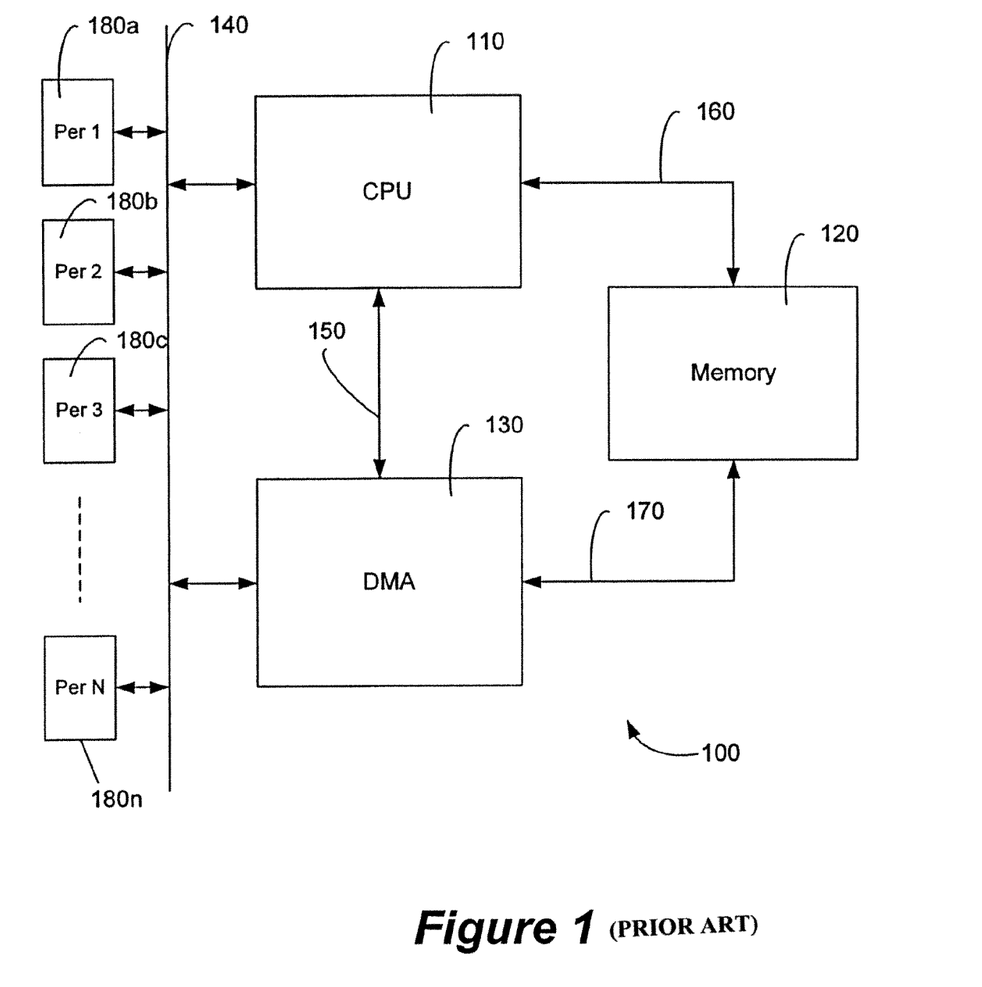
FIG. 1 is a block diagram showing typical DMA controller within a computer system, such as for example, a microcontroller.

Turning to the drawings, exemplary embodiments of the present application will now be described. FIG. 1 depicts a typical embodiment of a DMA controller within a computer system, such as a microcontroller. A computer system 100, such as for example a microcontroller, generally comprises a central processing unit (CPU) 110 which is coupled to one or more bus systems. In FIG. 1 an exemplary main bus 140 is shown. Through this bus 140, the CPU 110 can communicate with a plurality of peripheral devices 180a ... 180n, such as I/O ports, memories; A/D and D/A converters, timers; pulse width modulators, etc. Furthermore, a dedicated memory bus 160 can be provided to couple the CPU 110 with a main memory 120. A direct memory access controller (DMA) is shown with numeral 130. this DMA controller 130 is also coupled with the main bus 140 to allow for data transfer between the devices coupled with this bus 140. In addition, the DMA unit may also be coupled through an additional bus 170 with main memory 120. Furthermore, DMA controller 130 may receive a plurality of control signals 150 from CPU 110. Such a system allows for data transfer by the DMA controller without CPU 110 between any devices 180a ... 180n coupled with bus 140 as well as between those devices 180a ... 180n and memory 120 or within memory 120. CPU 110 is usually only needed to initialize DMA controller 130.

Once DMA controller 130 is programmed, the data transfer proper is conducted without the aid of CPU 110. CPU 110 is then free to perform other tasks.

Figure 2:
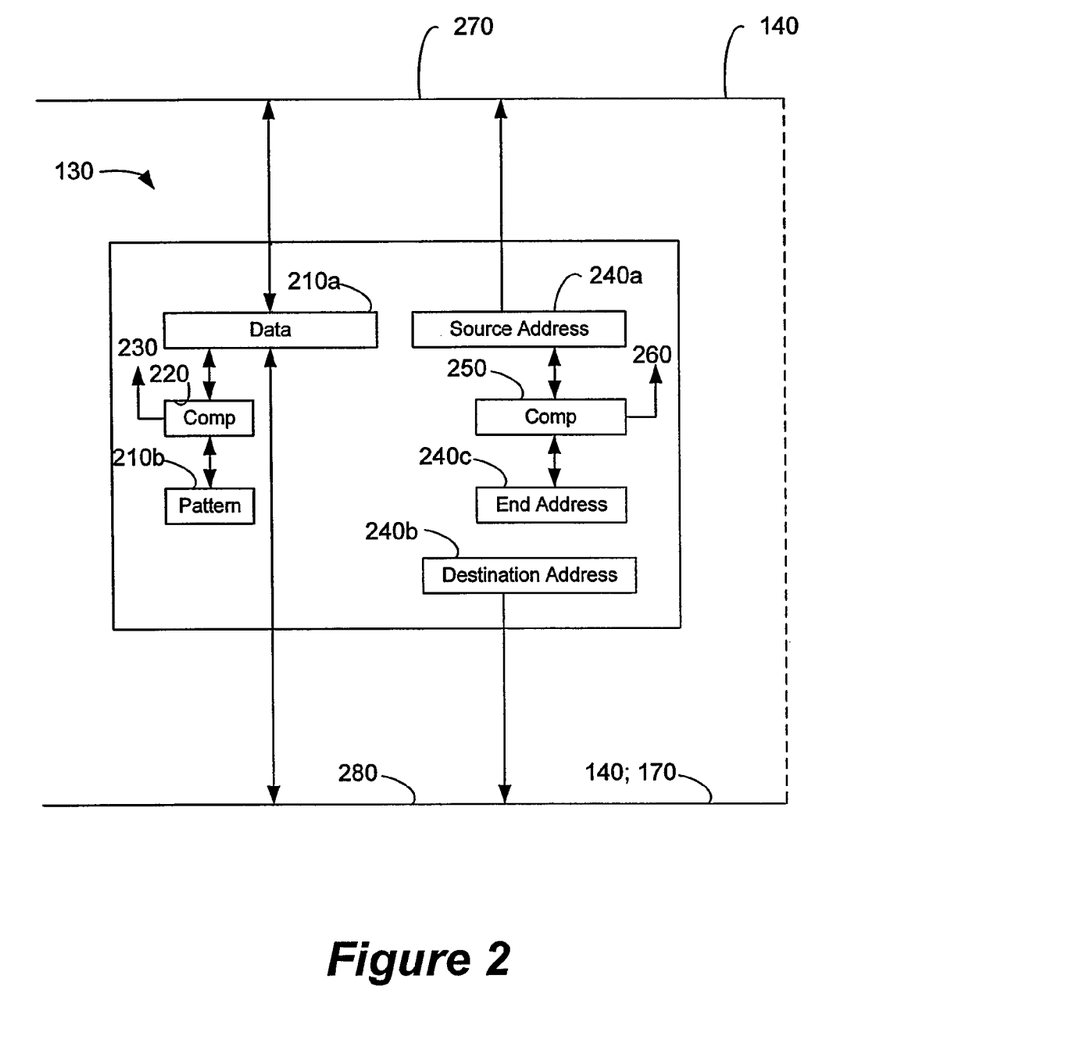
FIG. 2 is a block diagram showing a details of a first embodiment of a DMA controller.

FIG. 2 shows more details of a DMA controller. According to one embodiment, a DMA controller 130 comprises at least a data register or latch 210a and an associated address register or latch 240a both coupled a receiving bus 270 and a transmitting bus 280. FIG. 2 indicates by the dotted line that receiving bus 270 and transmitting bus 280 can be one and the same, such as bus 140 shown in FIG. 1. However, in another embodiment, DMA controller 130 can also be configured to communicate between two different buses. In such an embodiment, a receiving bus 270 can be, for example, bus 140 as shown in FIG. 1 and a transmitting bus 280 can be bus 170 as shown in FIG. 1. Both registers or latches for address and data 210a and 240a are coupled with these buses. Alternatively separate registers for transmitting and receiving can be provided. Separate address registers 240a and 240b as shown in FIG. 2 are useful as source and destination address usually differ. The data register 210a and the transmitting and/or receiving register 240a, b may further be coupled with a comparator to determine a match 230, 260 in the data or address.

During a DMA data transfer, the DMA controller 130 can be programmed to transfer a specific amount of data beginning at a source start address and ending at a source end address to a destination which also begins at a destination start address and ends at a destination end address. To this end, for example, register 240a is loaded with the source start address and register 240b is loaded with the destination start address. DMA controller 130 further receives either the length of the data block to transferred or a source end address. If the source end address is used, then this address is loaded in a respective register 240c coupled with a comparator 250. Alternatively, the destination end address or as stated above, the length of the data block can be used to determine the end of the transfer. Once such an exemplary initialization has been conducted, the data transfer proper takes place.

In the following a transfer using a single bus 140 is explained. DMA controller 130 puts the first address, the source start address stored in register 240a on bus 140. This address can be within a memory or any device coupled with bus 140. An associated data is then transferred into data register 210a. In a following step, register 240a is decoupled from bus 140 and register 240b is coupled with bus 140. Alternatively, if only one address register is used, this address register is loaded with the destination start address. Thus, the destination address is now put on bus 140 addressing the respective destination such as a memory or any device coupled with bus 140. Then, the data stored in register 210a is transferred to this destination address. Source address register 240a and destination address register 240b are then incremented and the process is repeated until the source address register 240a contains the source end address. This end of transmission can, for example, be detected by comparator 250 which compares the contents of address register 240a and register 240c and generates a match signal 260.

In addition, DMA controller 130 allows for a conditional transfer that stops the transfer once a specific pattern such as a predefined data byte has been received. To this end, DMA controller 130 comprises a further pattern register 210b. Upon initialization, this register 210b is loaded with a pattern such as a specific byte. Once comparator 220 detects a match between the loaded data in register 210a and the pattern register 210b a respective signal 230 is generated which indicates to DMA controller 130 that the end of transmission has been reached. To prevent an endless transmission, the address comparator 250 can be used in addition defining a maximum transfer.

Thus, the DMA controller according to such an embodiment generally allows two different types of transaction. A first transaction is defined as a fixed length transmission allowing for a defined block of data to be transferred by the DMA controller. The second transaction has an open length and its length is defined by a specific pattern. For example, the end of transmission can be defined by a specific symbol. Moreover, in another embodiment, a sequence of symbols may define the end of transmission. Thus, a more flexible definition of an end of transmission is possible. For example, instead of a single byte a sequence of two bytes can be used such as a carriage return (CR) line feed (LF) sequence. To this end, a plurality of registers can be provided which are programmed with the respective sequence. The second transaction type can be enhanced with a maximum transfer length to avoid an endless transfer loop and thus provide for additional security.

Figure 3:
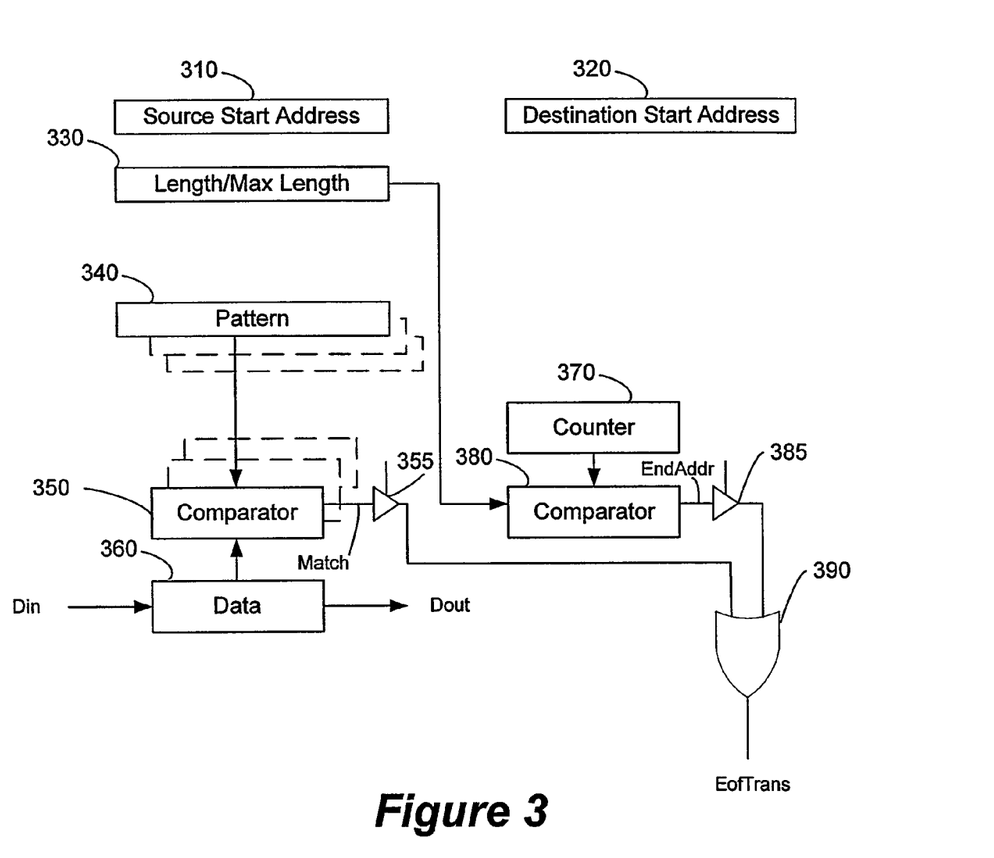
FIG. 3 is a block diagram showing a details of a second embodiment of a DMA controller.

FIG. 3 shows specific registers of another exemplary embodiment of a DMA controller. In this embodiment, a source register 310 and a destination address register 320 are provided. Furthermore, a length/maximum length register 330 is coupled with a comparator 380 which can generate an end address detection EndAddr. Comparator 380 is furthermore coupled with a counter 370. A pattern register 340 is coupled with another comparator 350 which is also coupled with a data register 360 receiving and transmitting the data proper Din and Dout. Comparator 350 generates a signal Match which can then produce an end of transmission signal EofTrans. Multiple pattern registers 340 and associated comparators can be provided as indicated by respective elements using dotted lines. Respective logic between the registers and the comparators can be provided to allow for the different types of transmission. As an example, FIG. 3 shows a first controllable driver 385 receiving the signal EndAddr from comparator 380. The output of driver 385 is coupled with a first input of an OR gate 390. A second controllable inverter 355 receives signal Match from comparator 350. The output of driver 355 is coupled with the second input of OR gate 390. Thus, the output of OR gate 390 provides for an end of transmission signal EofTrans.

In a first mode, driver 355 is controlled to decouple comparator 350 from OR gate 390 generating a constant logic low signal at the second input of OR gate 390 and driver 385 is controlled to couple comparator 380 with OR gate 390. Register 310 and 320 are loaded with the respective source start address and destination start address. Register 330 is loaded with the length of the data block to be transmitted and counter 370 is reset to zero. Then the data transfer can be started. To this end, the data addressed by register 310 is loaded into register 360 and written to the address contained in register 320. Then, registers 310 and 320 are incremented by the size of the transmitted data. For example, if data register is a byte wide register, then registers 310 and 320 are incremented by 1. If data register is a 16 bit register, then registers 310 and 320 are incremented by 2, and so on. Counter 370 is incremented accordingly. Comparator 380 is comparing the counter value of counter 370 with register 330. The transfer of data is repeated until the counter value matches the content of register 330. If such a match is reached, the EndAddr signal goes logic high and the output of Or gate 390 will go high indicating an end of transmission EofTrans. As a result, the DMA controller is stopped.

In a second mode, driver 385 is controlled to decouple comparator 380 from OR gate 390 generating a constant logic low signal at the first input of OR gate 390 and driver 355 is controlled to couple comparator 350 with OR gate 390. In this mode, again source and destination registers 310 and 320 are loaded with the respective start addresses. In addition pattern register 340 is loaded with predefined pattern. Again, the DMA transfer is staffed and the first data associated with the source register is loaded into data register 360 and compared with pattern register 340. If a match occurs, comparator 350 generates a high signal at its output which causes a high signal at the output of OR gate 390 and indicates the end of the transmission. Otherwise, registers 310 and 320 are incremented and the transfer continues until a match between the transmitted data and the pattern register 340 occurs.

In a third mode, both drivers 355 and 385 are activated coupling both comparators 350 and 380 with OR gate 390. In this mode, registers 310 and 320 are again loaded with the respective start addresses. Furthermore, a maximum length value is loaded into register 330 and a pattern is loaded into register 340. The data transfer takes place as described above. However, the end of transmission is either generated by comparator 350 or 380. During a normal transmission, comparator 350 will detect the end of transmission by a match between the transmitted data and the pattern register 340. If, however, due to an error or a malfunction this data never occurs, then comparator 380 will terminate the transmission once the maximum length of data transmission has been reached.

Figure 4:
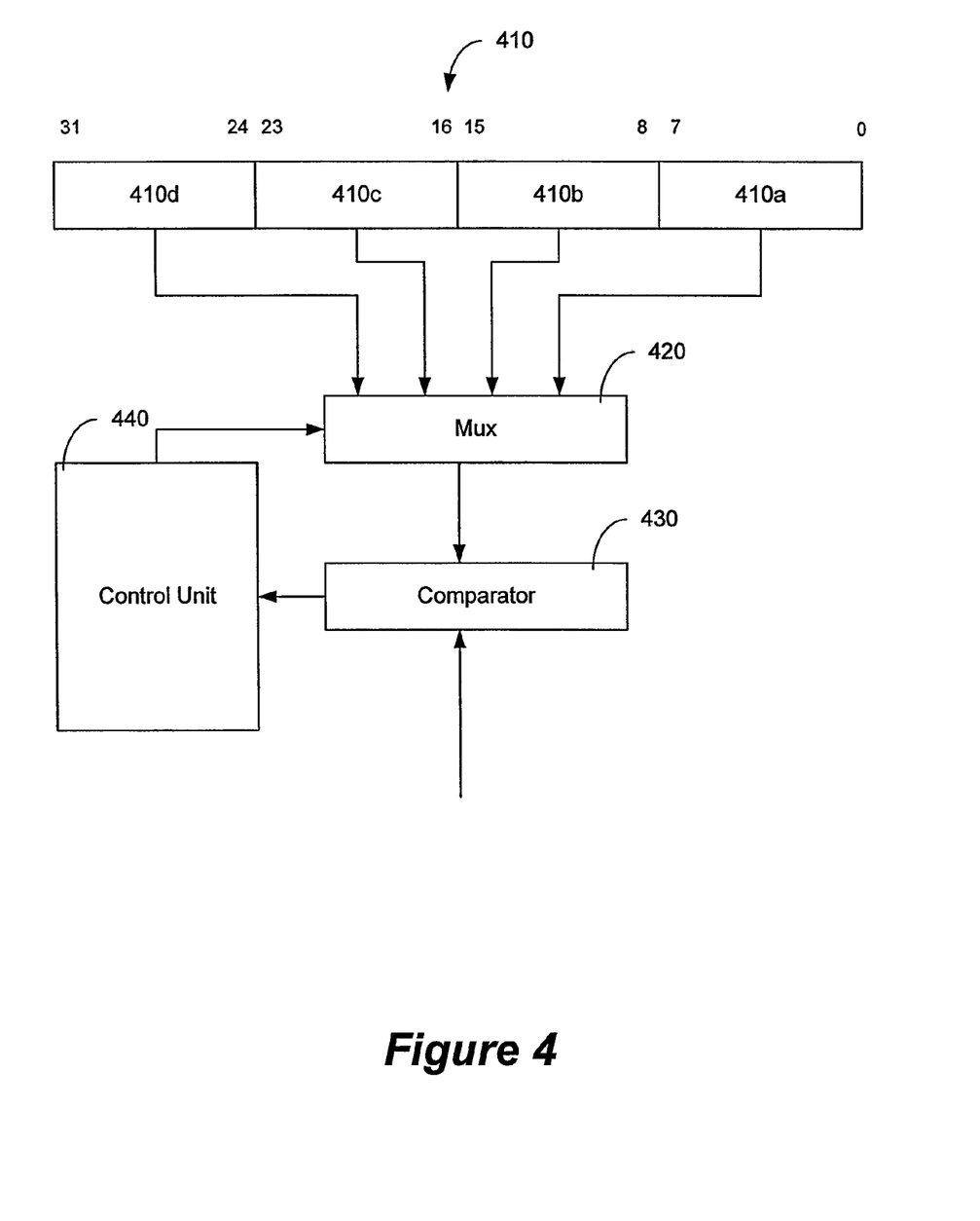
FIG. 4 is a block diagram showing a details of a third embodiment of a DMA controller.

FIG. 4 shows another embodiment of a pattern register. In this embodiment a pattern register 410 has a width of 32 bits and, thus, consists of four bytes 410a . . . 410d. Each byte 410a . . . 410d is coupled with a 4:1 multiplexer 420 having 32 inputs and 8 outputs. The output lines of multiplexer 420 are coupled with a comparator 430 which compares the 8 bits with the content of the data register (not shown). A control unit 440 is provided to control multiplexer 420. This embodiment allows for the comparison of a data sequence. In a first mode, pattern register 410 is loaded with a predefined 32 bit pattern. At the beginning of a data transfer, the multiplexer is controlled to couple the first byte 410a of register 410 with comparator 430. Once a match with a transmitted data byte occurs, the comparator signals such a match to control unit 440. Control unit 440 then switches multiplexer 420 to couple the second byte 410b with comparator 430. If the next data byte transferred byte the DMA controller matches the second byte 410b, then control unit switches the multiplexer again to allow for a comparison of the next byte with byte 410c. Only if four sequential bytes match the content of register 410d an end of transmission signal is generated. If a miss occurs before the last byte 410d has been compared, then multiplexer 420 is reset to the first byte 410a to start a new sequence comparison. The unit can be programmed to allow for any length of the pattern sequence. In this embodiment, for example, a one byte sequence, a two byte sequence, a three byte sequence or a four byte sequence can be used. Depending on the size of the pattern register any sequence length can be implemented.

In a second mode, the sequence must not occur in a continuous order. For example, any number of intermediary bytes can be allowed. Thus, multiplexer 420 would not be reset to the first byte 410a if a mismatch occurs in a following byte. Thus, if pattern register is programmed, for example, with "0x64A8" a sequence of "0x<u>68</u>8<u>4</u>0A<u>A</u>BC<u>8</u>" (underlined bytes show match) would trigger the end of transmission signal. If yet another embodiment, a plurality of comparators and a multiple byte register can be used to even allow for a non sequential match. Thus, an end of transmission signal would be generated if all bytes within the pattern occurred even if they are out of order. Instead of a plurality of comparators, the configuration shown in FIG. 4 can also be used to compare each byte 410a ... 410d with each transmitted data by sequentially switching through all four data bytes 410a ... 410d per data cycle. The control unit can set respective bits for each data segment 410a ... 410d. Once all bits have been set, an end of transmission signal can be generated. Any other combination of possible comparisons can be implemented.

Figure 5:
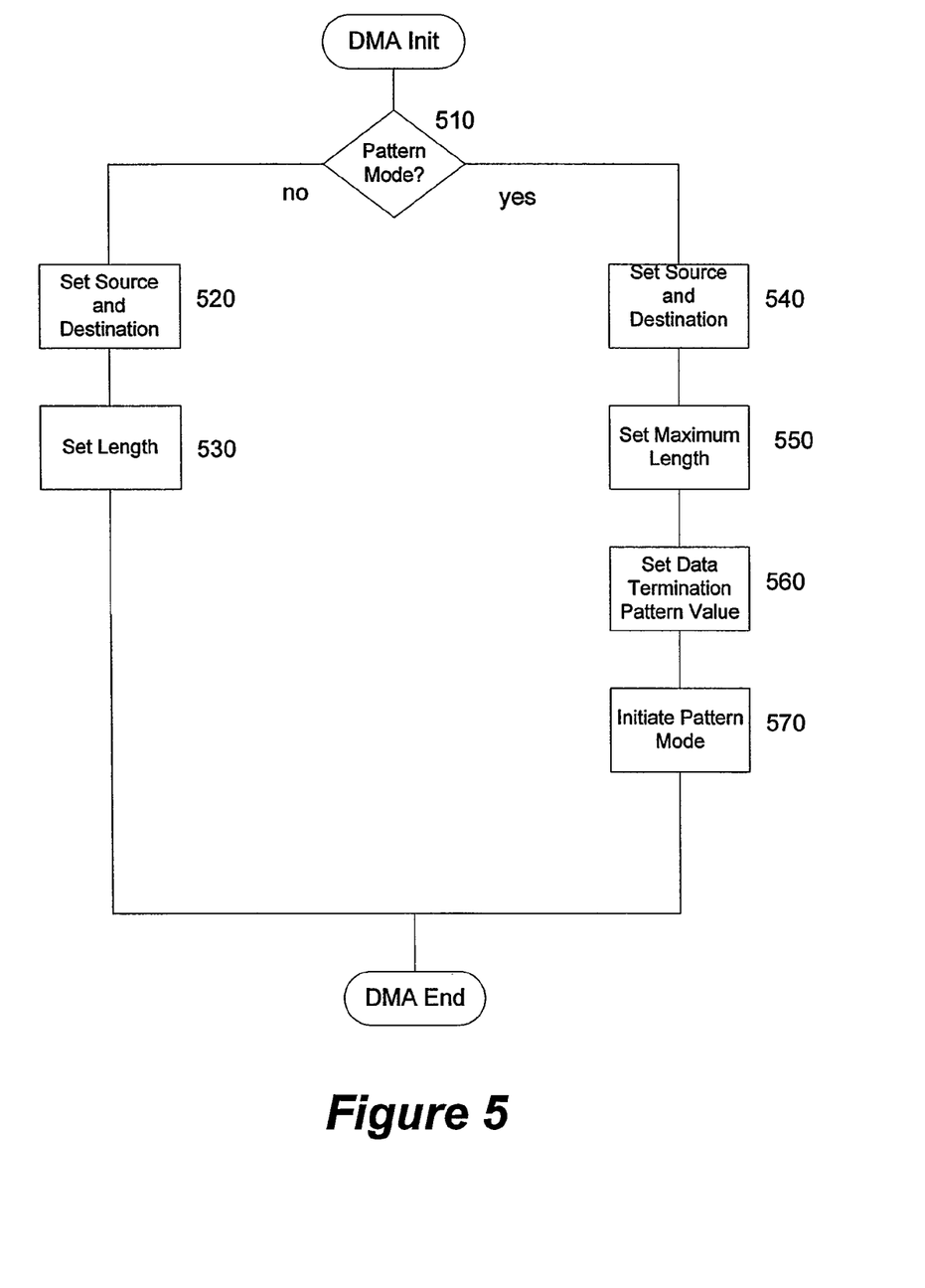
FIG. 5 is a flowchart of a initialization routine for a DMA controller.

FIG. 5 shows a flow chart of an embodiment of an initialization routine for a DMA controller. In a first step 510 a decision is made whether a pattern mode is used or not. If no, the routine branches to step 520 in which the source and destination address are stored. in a following step 530 the length of the transmission is determined either by an end address or a block length. then the routine ends. If the pattern mode is used, the routine goes to step 540 in which the source and destination are set. Then in step 550, optionally the maximum length of the transmission is set and in step 560 the data termination pattern value is stored. In step 570 the pattern mode is set and the initialization routine ends.

Figure 6:
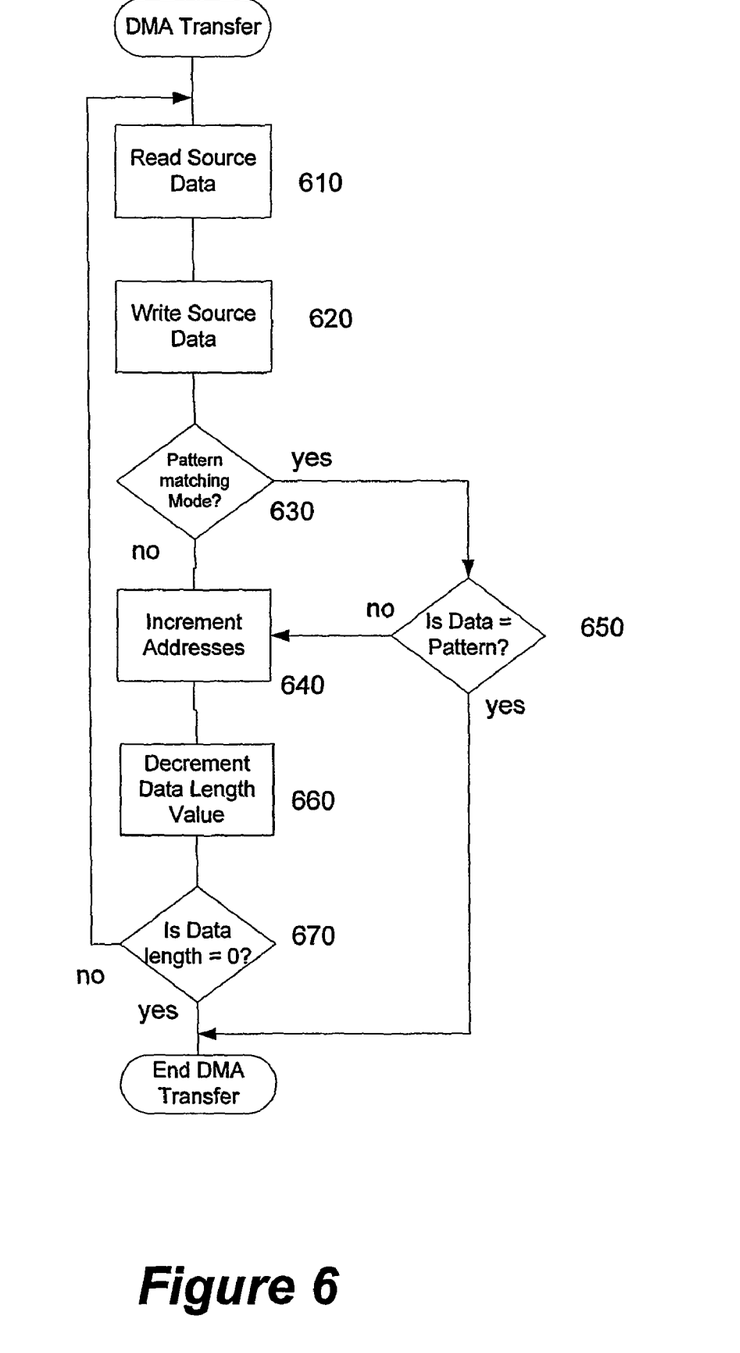
FIG. 6 is a flowchart of a transfer routine of a DMA controller.

FIG. 6 shows a flow chart of an embodiment of a DMA transfer routine following the initialization routine shown in FIG. 5. The routine starts in step 610 in which the source data under the start address is read. In step 620 this data written to the destination address. In step 630 it is checked whether the pattern matching mode has been set. If not the source address and destination address are incremented in step 640 and in step 660 the data length value is decremented. In step 670 it is checked whether the data length value is 0. If yes, the transfer ends, if not the routine returns to step 610. If the pattern mode has been set, the routine branches from step 630 to step 650 in which it is checked whether the data matches the pattern. If a match occurs, then the transfer ends. Otherwise, the routine continues with step 640 as stated above.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A direct memory access controller comprising:
   a data register for transferring a plurality of data in parallel from a source to a destination address, wherein the plurality of data is sequentially loaded into said data register;
   a pattern register;
   a data comparator coupled with the data register and the pattern register and for comparing the content of said data register with the content of said pattern register; and
   a control unit coupled with the data comparator wherein the control unit stops a data transfer if the data comparator detects a match of the data register and the pattern register.

2. The direct memory access controller according to claim 1, further comprising an address comparator for comparing the source or the destination address with a predefined end address.

3. The direct memory access controller according to claim 2, further comprising logic means for generating an end of transmission signal from output signals of the data and address comparators.

4. The direct memory access controller according to claim 1, wherein the data register has a size of n-bits and said pattern register comprises a plurality of data segments each data segment having the size of n-bits and said data comparator is controlled to compare a selected segment with the data register.

5. The direct memory access controller according to claim 1, further comprising a plurality of comparators coupled with the data registers.

6. The direct memory access controller according to claim 4, further comprising a multiplexer coupled with said plurality of data segments of said pattern register and said data comparator.

7. The direct memory access controller according to claim 6, further comprising a control unit for controlling said multiplexer.

8. A microcontroller comprising:
   a central processing unit;
   a bus coupled with said central processing unit;
   a memory coupled with said bus;
   a peripheral unit coupled with said bus; and
   a direct memory access controller for transferring data in parallel from a source to a destination coupled with said bus comprising:
      a data register for transferring a plurality of data from a source to a destination address, wherein the data register receives said plurality of data sequentially for parallel transfer;
      a pattern register;
      a data comparator coupled with the data register and the pattern register; and a control unit coupled with the data comparator wherein the control unit stops a data transfer if the data comparator detects a match of the data register and the pattern register.

9. The microcontroller according to claim 8, further comprising an address comparator for comparing the source or the destination address with a predefined end address.

10. The microcontroller according to claim 9, further comprising logic means for generating an end of transmission signal from output signals of the data and address comparators.

11. The microcontroller according to claim 8, wherein the data register has the size of n-bits and said pattern register comprises a plurality of data segments each data segment having a size of n-bits and said data comparator is controlled to compare a selected segment with the data register.

12. The microcontroller according to claim 8, further comprising a plurality of comparators coupled with the data registers.

13. The microcontroller according to claim 11, further comprising a multiplexer coupled with said plurality of data segments of said pattern register and said data comparator.

14. The microcontroller according to claim 13, further comprising a control unit for controlling said multiplexer.

15. A microcontroller comprising:
    a central processing unit;
    a first bus coupled with said central processing unit;
    a peripheral unit coupled with said first bus;
    a second bus coupled with said central processing unit;
    a memory coupled with said second bus; and
    a direct memory access controller coupled with said first and said second bus comprising:

an n-bit data register for transferring a plurality of n-bit data from a source to a destination address, wherein the plurality of n-bit data is sequentially loaded into said data register;

a pattern register having a plurality of n-bit segments a data comparator coupled with the n-bit data register and the plurality of n-bit segments of said pattern register; and a control unit coupled with the data comparator operable to stop a data transfer if the data comparator detects a match of said plurality of sequential n-bit data received in the data register and the content of the plurality of n-bit segments of the pattern register.

16. A method of performing a transmission of a plurality of data in parallel from a source to a destination by a direct memory access controller comprising the steps of:
   a) determining whether a pattern detection is used;
   b) storing start addresses for a source address and a destination address;
   c) when said pattern detection is used storing a pattern; otherwise storing a transmission length;
   d) reading a data element in parallel from said source address;
   e) storing the data element in said destination address;
   f) when said pattern detection is used, comparing said data element with said pattern and terminating said transmission upon a match;
   g) transmitting said data element to said destination address in parallel and incrementing said source and destination addresses;
   h) when said pattern detection is not used, terminating said transmission if said transmission length has been reached; and
   i) repeating steps d)-h) until said match occurs when using said pattern detection or said transmission length is reached.

17. The method according to claim 16, further comprising using step h) even if said pattern detection is used.

18. The method according to claim 16, wherein said pattern is longer than said data element and a plurality of data elements are compared with a selected portion of said pattern and only if the plurality of data elements match the pattern the transmission is terminated, wherein said selected portion is selected by a multiplexer.

19. The method according to claim 18, wherein said multiplexer initially selects a first portion of said pattern and upon a first match selects a following portion of said pattern.

20. The method according to claim 19, wherein said multiplexer is reset to select said first portion of said pattern if after the first match a following comparison of said data element generates a mismatch.

21. A method of performing a transmission of a plurality of data from a source to a destination by a direct memory access controller comprising the steps of:
   a) determining whether a pattern detection is used;
   b) storing start addresses for a source address and a destination address;
   c) when said pattern detection is used storing a pattern, wherein said pattern is longer than a data element of said plurality of data; otherwise storing a transmission length;
   d) reading a data element from said source address;
   e) storing the data element in said destination address;
   f) when said pattern detection is used, comparing said data element with a selected portion of said pattern and terminating said transmission upon a match of a plurality of sequential data elements and said pattern;
   g) transmitting said data element to said destination address and incrementing said source and destination addresses;
   h) when said pattern detection is not used, terminating said transmission if said transmission length has been reached; and
   i) repeating steps d)-h) until said match occurs when using said pattern detection or said transmission length is reached.

22. The method according to claim 21, further comprising using step h) even if said pattern detection is used.

23. The method according to claim 21, wherein said selected portion is selected by a multiplexer.

24. The method according to claim 23, wherein said multiplexer initially selects a first portion of said pattern and upon a first match selects a following portion of said pattern.

25. The method according to claim 24, wherein said multiplexer is reset to select said first portion of said pattern if after the first match a following comparison of said data element generates a mismatch.

* * * * *